United States Patent
Boutin et al.

(10) Patent No.: US 10,139,843 B2
(45) Date of Patent: Nov. 27, 2018

(54) WIRELESS THERMOSTATIC CONTROLLED ELECTRIC HEATING SYSTEM

(75) Inventors: Dominic Boutin, St-Hubert (CA);
Daniel Gelinas, Eastman (CA);
Stephane Joseph Pierre Beland,
St-Jean-sur-Richelieu (CA); Vincent Boutin, Montreal (CA)

(73) Assignee: Honeywell International Inc., Morris Plains, NJ (US)

( * ) Notice: Subject to any disclaimer, the term of this patent is extended or adjusted under 35 U.S.C. 154(b) by 1261 days.

(21) Appl. No.: 13/402,647

(22) Filed: Feb. 22, 2012

(65) Prior Publication Data
US 2013/0213952 A1  Aug. 22, 2013

(51) Int. Cl.
H05B 1/02 (2006.01)
G05D 23/19 (2006.01)

(52) U.S. Cl.
CPC .... *G05D 23/1905* (2013.01); *Y10T 29/49002* (2015.01)

(58) Field of Classification Search
CPC ............................................ F24F 2011/0068
USPC .......................... 236/51; 219/497, 506, 494
See application file for complete search history.

(56) References Cited

U.S. PATENT DOCUMENTS

| 3,464,673 A | 9/1969 | Cargo et al. |
| 3,665,159 A | 5/1972 | Becker et al. |
| 3,899,713 A | 8/1975 | Barkan et al. |
| 3,942,028 A | 3/1976 | Baker |
| 4,078,720 A | 3/1978 | Nurnberg |
| 4,079,366 A | 3/1978 | Wong |
| 4,093,943 A | 6/1978 | Knight |
| 4,151,387 A | 4/1979 | Peters, Jr. |

(Continued)

FOREIGN PATENT DOCUMENTS

| CA | 1035448 A | 7/1978 |
| DE | 3334117 A1 | 4/1985 |

(Continued)

OTHER PUBLICATIONS

Cirrus Logic, Inc., "CS1501 Digital Power Factor Correction Control IC," 16 pages, 2012.

(Continued)

*Primary Examiner* — Mark Paschall
(74) *Attorney, Agent, or Firm* — Seager, Tufte & Wickhem LLP

(57) ABSTRACT

An electric heating system controlled with a remote thermostat. The system may incorporate wireless technology and a line voltage equipment interface sub-system. The sub-system may have a line voltage relay and an antenna. The relay may be mounted within an electric heater enclosure. The antenna may be mounted directly on the enclosure. The antenna may receive temperature control signals from a transmitter of the thermostat. The signals may be processed to control a connection of the heater to power with a relay receiving the processed control signals. The control of power to the heater may maintain a temperature approximately equal to a thermostat temperature setting. The antenna and relay electronics may provide a backup control of the heater in the event of, for example, a loss of signals from the thermostat. The backup control may prevent the temperature proximate to equipment interface sub-system from approaching a freezing point.

17 Claims, 14 Drawing Sheets

(56) References Cited

U.S. PATENT DOCUMENTS

| | | | |
|---|---|---|---|
| 4,174,807 A | 11/1979 | Smith et al. |
| 4,197,571 A | 4/1980 | Grunert |
| 4,206,872 A | 6/1980 | Levine |
| 4,224,615 A | 9/1980 | Penz |
| 4,232,819 A | 11/1980 | Bost |
| 4,257,555 A | 3/1981 | Neel |
| 4,264,034 A | 4/1981 | Hyltin et al. |
| 4,274,045 A | 6/1981 | Goldstein |
| 4,296,334 A | 10/1981 | Wong |
| 4,298,946 A | 11/1981 | Hartsell et al. |
| 4,300,199 A | 11/1981 | Yoknis et al. |
| 4,308,991 A | 1/1982 | Peinetti et al. |
| 4,316,256 A | 2/1982 | Hendricks et al. |
| 4,332,352 A | 6/1982 | Jaeger |
| 4,337,822 A | 7/1982 | Hyltin et al. |
| 4,337,893 A | 7/1982 | Flanders et al. |
| 4,373,664 A | 2/1983 | Barker et al. |
| 4,379,483 A | 4/1983 | Farley |
| 4,382,544 A | 5/1983 | Stewart |
| 4,384,213 A | 5/1983 | Bogel |
| 4,386,649 A | 6/1983 | Hines et al. |
| 4,388,692 A | 6/1983 | Jones et al. |
| 4,431,134 A | 2/1984 | Hendricks et al. |
| 4,446,913 A | 5/1984 | Krocker |
| 4,479,604 A | 10/1984 | Didner |
| 4,503,471 A | 3/1985 | Hanajima et al. |
| 4,504,778 A | 3/1985 | Evans |
| 4,506,827 A | 3/1985 | Jamieson et al. |
| 4,556,169 A | 12/1985 | Zervos |
| 4,585,164 A | 4/1986 | Butkovich et al. |
| 4,606,401 A | 8/1986 | Levine et al. |
| 4,621,336 A | 11/1986 | Brown |
| 4,622,544 A | 11/1986 | Bially et al. |
| 4,641,013 A | 2/1987 | Dunnigan et al. |
| 4,646,964 A | 3/1987 | Parker et al. |
| 4,692,596 A | 9/1987 | Payne |
| 4,706,177 A | 11/1987 | Josephson |
| 4,717,333 A | 1/1988 | Carignan |
| 4,725,001 A | 2/1988 | Carney et al. |
| 4,745,300 A | 5/1988 | Kammerer et al. |
| 4,745,311 A | 5/1988 | Iwasaki |
| 4,806,843 A | 2/1989 | Mertens et al. |
| 4,811,163 A | 3/1989 | Fletcher |
| 4,829,779 A | 5/1989 | Munson et al. |
| 4,837,731 A | 6/1989 | Levine et al. |
| 4,881,686 A | 11/1989 | Mehta |
| 4,918,439 A | 4/1990 | Wozniak et al. |
| 4,939,995 A | 7/1990 | Feinberg |
| 4,942,613 A | 7/1990 | Lynch |
| 4,948,040 A | 8/1990 | Kobayashi et al. |
| 4,969,508 A | 11/1990 | Tate et al. |
| 4,992,779 A | 2/1991 | Sugino et al. |
| 4,997,029 A | 3/1991 | Otsuka et al. |
| 5,005,365 A | 4/1991 | Lynch |
| 5,012,973 A | 5/1991 | Dick et al. |
| 5,025,134 A | 6/1991 | Bensoussan et al. |
| 5,036,698 A | 8/1991 | Conti |
| 5,038,851 A | 8/1991 | Mehta |
| 5,053,752 A | 10/1991 | Epstein et al. |
| 5,065,813 A | 11/1991 | Berkeley et al. |
| 5,081,411 A | 1/1992 | Walker |
| 5,086,385 A | 2/1992 | Launey et al. |
| 5,088,645 A | 2/1992 | Bell |
| 5,118,963 A | 6/1992 | Gesin |
| 5,120,983 A | 6/1992 | Samann |
| 5,140,310 A | 8/1992 | DeLuca et al. |
| 5,161,606 A | 11/1992 | Berkeley et al. |
| 5,170,935 A | 12/1992 | Federspiel et al. |
| 5,172,565 A | 12/1992 | Wruck et al. |
| 5,181,653 A | 1/1993 | Foster et al. |
| 5,187,797 A | 2/1993 | Nielsen et al. |
| 5,192,874 A | 3/1993 | Adams |
| 5,210,685 A | 5/1993 | Rosa |
| 5,221,877 A | 6/1993 | Falk |
| 5,226,591 A | 7/1993 | Ratz |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,272,477 A | 12/1993 | Tashima et al. |
| 5,277,244 A | 1/1994 | Mehta |
| 5,289,047 A | 2/1994 | Broghammer |
| 5,294,849 A | 3/1994 | Potter |
| 5,329,991 A | 7/1994 | Mehta et al. |
| 5,348,078 A | 9/1994 | Dushane et al. |
| 5,351,035 A | 9/1994 | Chrisco |
| 5,361,009 A | 11/1994 | Lu |
| 5,386,577 A | 1/1995 | Zenda |
| 5,390,206 A | 2/1995 | Rein et al. |
| 5,404,934 A | 4/1995 | Carlson et al. |
| 5,414,618 A | 5/1995 | Mock et al. |
| 5,429,649 A | 7/1995 | Robin |
| 5,439,441 A | 8/1995 | Grimsley et al. |
| 5,452,197 A | 9/1995 | Rice |
| 5,462,225 A * | 10/1995 | Massara ............ G05D 23/1905 |
| | | | 236/47 |
| 5,482,209 A | 1/1996 | Cochran et al. |
| 5,495,887 A | 3/1996 | Kathnelson et al. |
| 5,506,572 A | 4/1996 | Hills et al. |
| 5,526,422 A | 6/1996 | Keen |
| 5,537,106 A | 7/1996 | Mitsuhashi |
| 5,544,036 A | 8/1996 | Brown, Jr. et al. |
| 5,566,879 A | 10/1996 | Longtin |
| 5,570,837 A | 11/1996 | Brown et al. |
| 5,579,197 A | 11/1996 | Mengelt et al. |
| 5,590,831 A | 1/1997 | Manson et al. |
| 5,603,451 A | 2/1997 | Helander et al. |
| 5,654,813 A | 8/1997 | Whitworth |
| 5,668,535 A | 9/1997 | Hendrix et al. |
| 5,671,083 A | 9/1997 | Connor et al. |
| 5,673,850 A | 10/1997 | Uptegraph |
| 5,679,137 A | 10/1997 | Erdman et al. |
| 5,682,206 A | 10/1997 | Wehmeyer et al. |
| 5,711,785 A | 1/1998 | Maxwell |
| 5,732,691 A | 3/1998 | Maiello et al. |
| 5,736,795 A | 4/1998 | Zuehlke et al. |
| 5,761,083 A | 6/1998 | Brown, Jr. et al. |
| 5,782,296 A | 7/1998 | Mehta |
| 5,801,940 A | 9/1998 | Russ et al. |
| 5,810,908 A | 9/1998 | Gray et al. |
| 5,818,428 A | 10/1998 | Eisenbrandt et al. |
| 5,833,134 A * | 11/1998 | Ho ...................... F24F 11/0076 |
| | | | 236/49.3 |
| 5,839,654 A * | 11/1998 | Weber ............................. 236/47 |
| 5,840,094 A | 11/1998 | Osendorf et al. |
| 5,862,737 A | 1/1999 | Chin et al. |
| 5,873,519 A | 2/1999 | Beilfuss |
| 5,886,697 A | 3/1999 | Naughton et al. |
| 5,899,866 A | 5/1999 | Cyrus et al. |
| 5,902,183 A | 5/1999 | D'Souza |
| 5,903,139 A | 5/1999 | Kompelien |
| 5,909,429 A | 6/1999 | Satyanarayana et al. |
| 5,915,473 A | 6/1999 | Ganesh et al. |
| 5,917,141 A | 6/1999 | Naquin, Jr. |
| 5,917,416 A | 6/1999 | Read |
| D413,328 S | 8/1999 | Kazama |
| 5,937,942 A | 8/1999 | Bias et al. |
| 5,947,372 A | 9/1999 | Tieman |
| 5,950,709 A | 9/1999 | Krueger et al. |
| 6,009,355 A | 12/1999 | Obradovich et al. |
| 6,013,121 A | 1/2000 | Chin et al. |
| 6,018,700 A | 1/2000 | Edel |
| 6,020,881 A | 2/2000 | Naughton et al. |
| 6,032,867 A * | 3/2000 | Dushane et al. ................ 236/51 |
| D422,594 S | 4/2000 | Henderson et al. |
| 6,059,195 A | 5/2000 | Adams et al. |
| 6,081,197 A | 6/2000 | Garrick et al. |
| 6,084,523 A | 7/2000 | Gelnovatch et al. |
| 6,089,221 A | 7/2000 | Mano et al. |
| 6,101,824 A | 8/2000 | Meyer et al. |
| 6,104,963 A | 8/2000 | Cebasek et al. |
| 6,119,125 A | 9/2000 | Gloudeman et al. |
| 6,121,875 A | 9/2000 | Hamm et al. |
| 6,140,987 A | 10/2000 | Stein et al. |

(56) References Cited

U.S. PATENT DOCUMENTS

| | | | |
|---|---|---|---|
| 6,141,595 A | 10/2000 | Gloudeman et al. | |
| 6,145,751 A | 11/2000 | Ahmed | |
| 6,149,065 A | 11/2000 | White et al. | |
| 6,152,375 A | 11/2000 | Robison | |
| 6,154,081 A | 11/2000 | Pakkala et al. | |
| 6,167,316 A | 12/2000 | Gloudeman et al. | |
| 6,190,442 B1 | 2/2001 | Redner | |
| 6,192,282 B1 | 2/2001 | Smith et al. | |
| 6,196,467 B1 | 3/2001 | Dushane et al. | |
| 6,205,041 B1 | 3/2001 | Baker | |
| 6,208,331 B1 | 3/2001 | Singh et al. | |
| 6,216,956 B1 | 4/2001 | Ehlers et al. | |
| 6,236,326 B1 | 5/2001 | Murphy | |
| 6,259,074 B1 | 7/2001 | Brunner et al. | |
| 6,260,765 B1 | 7/2001 | Natale et al. | |
| 6,285,912 B1 | 9/2001 | Ellison et al. | |
| 6,288,458 B1 | 9/2001 | Berndt | |
| 6,290,140 B1 | 9/2001 | Pesko et al. | |
| D448,757 S | 10/2001 | Okubo | |
| 6,315,211 B1 | 11/2001 | Sartain et al. | |
| 6,318,639 B1 | 11/2001 | Toth | |
| 6,321,637 B1 | 11/2001 | Shanks et al. | |
| 6,330,806 B1 | 12/2001 | Beaverson et al. | |
| 6,344,861 B1 | 2/2002 | Naughton et al. | |
| 6,351,693 B1 | 2/2002 | Monie et al. | |
| 6,356,038 B2 | 3/2002 | Bishel | |
| 6,385,510 B1 | 5/2002 | Hoog et al. | |
| 6,394,359 B1 | 5/2002 | Morgan | |
| 6,397,612 B1 | 6/2002 | Kernkamp et al. | |
| 6,398,118 B1 | 6/2002 | Rosen et al. | |
| 6,448,896 B1 | 9/2002 | Bankus et al. | |
| 6,449,726 B1 | 9/2002 | Smith | |
| 6,453,687 B2 | 9/2002 | Sharood et al. | |
| D464,948 S | 10/2002 | Vasquez et al. | |
| 6,460,774 B2 | 10/2002 | Sumida et al. | |
| 6,466,132 B1 | 10/2002 | Caronna et al. | |
| 6,478,233 B1 | 11/2002 | Shah | |
| 6,490,174 B1 | 12/2002 | Kompelien | |
| 6,502,758 B2 | 1/2003 | Cottrell | |
| 6,507,282 B1 | 1/2003 | Sherwood | |
| 6,512,209 B1 | 1/2003 | Yano | |
| 6,518,953 B1 | 2/2003 | Armstrong | |
| 6,518,957 B1 | 2/2003 | Lehtinen et al. | |
| 6,546,419 B1 | 4/2003 | Humpleman et al. | |
| 6,556,899 B1 | 4/2003 | Harvey et al. | |
| 6,566,768 B2 | 5/2003 | Zimmerman et al. | |
| 6,574,537 B2 | 6/2003 | Kipersztok et al. | |
| 6,578,770 B1 | 6/2003 | Rosen | |
| 6,580,950 B1 | 6/2003 | Johnson et al. | |
| 6,581,846 B1 | 6/2003 | Rosen | |
| 6,587,739 B1 | 7/2003 | Abrams et al. | |
| 6,595,430 B1 | 7/2003 | Shah | |
| 6,596,059 B1 | 7/2003 | Greist et al. | |
| D478,051 S | 8/2003 | Sagawa | |
| 6,608,560 B2 | 8/2003 | Abrams | |
| 6,619,055 B1 | 9/2003 | Addy | |
| 6,619,555 B2 | 9/2003 | Rosen | |
| 6,621,507 B1 | 9/2003 | Shah | |
| 6,622,925 B2 | 9/2003 | Carner et al. | |
| 6,635,054 B2 | 10/2003 | Fjeld et al. | |
| 6,685,098 B2 | 2/2004 | Okano et al. | |
| 6,702,811 B2 | 3/2004 | Stewart et al. | |
| 6,726,112 B1 | 4/2004 | Ho | |
| D492,282 S | 6/2004 | Lachello et al. | |
| 6,771,996 B2 | 8/2004 | Bowe et al. | |
| 6,783,079 B2 | 8/2004 | Carey et al. | |
| 6,786,421 B2 | 9/2004 | Rosen | |
| 6,789,739 B2 | 9/2004 | Rosen | |
| 6,801,849 B2 | 10/2004 | Szukala et al. | |
| 6,807,041 B2 | 10/2004 | Geiger et al. | |
| 6,808,524 B2 | 10/2004 | Lopath et al. | |
| 6,810,307 B1 | 10/2004 | Addy | |
| 6,810,397 B1 | 10/2004 | Qian et al. | |
| 6,824,069 B2 | 11/2004 | Rosen | |
| 6,833,990 B2 | 12/2004 | LaCroix et al. | |
| 6,842,721 B2 | 1/2005 | Kim et al. | |
| 6,851,621 B1 | 2/2005 | Wacker et al. | |
| 6,868,293 B1 | 3/2005 | Schurr et al. | |
| 6,893,438 B2 | 5/2005 | Hall et al. | |
| 6,934,862 B2 | 8/2005 | Sharood et al. | |
| D512,208 S | 12/2005 | Kubo et al. | |
| 6,973,410 B2 | 12/2005 | Seigel | |
| 7,001,495 B2 | 2/2006 | Essalik et al. | |
| 7,013,845 B1 * | 3/2006 | McFarland | F02B 47/02 123/25 R |
| D520,989 S | 5/2006 | Miller | |
| 7,050,026 B1 | 5/2006 | Rosen | |
| 7,055,759 B2 | 6/2006 | Wacker et al. | |
| 7,080,358 B2 | 7/2006 | Kuzmin | |
| 7,083,109 B2 | 8/2006 | Pouchak | |
| 7,083,189 B2 | 8/2006 | Ogata | |
| 7,084,774 B2 | 8/2006 | Martinez | |
| 7,089,088 B2 | 8/2006 | Terry et al. | |
| 7,108,194 B1 | 9/2006 | Hankins, II | |
| 7,130,719 B2 | 10/2006 | Ehlers et al. | |
| D531,588 S | 11/2006 | Peh | |
| 7,133,748 B2 | 11/2006 | Robinson | |
| D533,515 S | 12/2006 | Klein et al. | |
| 7,146,253 B2 | 12/2006 | Hoog et al. | |
| 7,152,806 B1 | 12/2006 | Rosen | |
| 7,156,318 B1 | 1/2007 | Rosen | |
| 7,163,156 B2 | 1/2007 | Kates | |
| 7,188,002 B2 | 3/2007 | Chapman, Jr. et al. | |
| D542,236 S | 5/2007 | Klein et al. | |
| 7,212,887 B2 | 5/2007 | Shah et al. | |
| 7,222,800 B2 | 5/2007 | Wruck et al. | |
| 7,225,054 B2 | 5/2007 | Amundson et al. | |
| 7,231,605 B1 | 6/2007 | Ramakasavan | |
| 7,232,075 B1 | 6/2007 | Rosen | |
| 7,240,289 B2 | 7/2007 | Naughton et al. | |
| 7,244,294 B2 | 7/2007 | Kates | |
| 7,261,762 B2 | 8/2007 | Kang et al. | |
| 7,263,283 B2 | 8/2007 | Knepler | |
| 7,274,973 B2 | 9/2007 | Nichols et al. | |
| 7,302,642 B2 | 11/2007 | Smith et al. | |
| 7,331,187 B2 | 2/2008 | Kates | |
| 7,341,201 B2 | 3/2008 | Stanimirovic | |
| 7,354,005 B2 | 4/2008 | Carey et al. | |
| RE40,437 E | 7/2008 | Rosen | |
| 7,419,532 B2 | 9/2008 | Sellers et al. | |
| 7,435,278 B2 | 10/2008 | Terlson | |
| 7,451,606 B2 | 11/2008 | Harrod | |
| 7,452,396 B2 | 11/2008 | Terlson et al. | |
| 7,476,988 B2 | 1/2009 | Mulhouse et al. | |
| 7,489,094 B2 | 2/2009 | Steiner et al. | |
| 7,496,627 B2 | 2/2009 | Moorer et al. | |
| 7,500,026 B2 | 3/2009 | Fukanaga et al. | |
| 7,505,914 B2 | 3/2009 | McCall | |
| 7,542,867 B2 | 6/2009 | Steger et al. | |
| 7,556,207 B2 | 7/2009 | Mueller et al. | |
| 7,574,283 B2 | 8/2009 | Wang et al. | |
| 7,584,897 B2 | 9/2009 | Schultz et al. | |
| 7,594,960 B2 | 9/2009 | Johansson | |
| 7,595,613 B2 | 9/2009 | Thompson et al. | |
| 7,600,694 B2 * | 10/2009 | Helt et al. | 236/1 B |
| 7,604,046 B2 | 10/2009 | Bergman et al. | |
| 7,617,691 B2 | 11/2009 | Street et al. | |
| 7,642,674 B2 | 1/2010 | Mulhouse et al. | |
| 7,644,591 B2 | 1/2010 | Singh et al. | |
| 7,665,019 B2 | 2/2010 | Jaeger | |
| 7,676,282 B2 | 3/2010 | Bosley | |
| 7,692,559 B2 | 4/2010 | Face et al. | |
| 7,707,189 B2 | 4/2010 | Haselden et al. | |
| 7,713,339 B2 | 5/2010 | Johansson | |
| 7,739,282 B1 | 6/2010 | Smith et al. | |
| 7,755,220 B2 | 7/2010 | Sorg et al. | |
| 7,770,242 B2 | 8/2010 | Sell | |
| 7,793,056 B2 | 9/2010 | Boggs et al. | |
| 7,814,516 B2 | 10/2010 | Stecyk et al. | |
| 7,837,676 B2 | 11/2010 | Sinelnikov et al. | |
| 7,838,803 B1 | 11/2010 | Rosen | |
| 7,859,815 B2 | 12/2010 | Black et al. | |
| 7,865,252 B2 | 1/2011 | Clayton | |
| 7,941,431 B2 | 5/2011 | Bluhm et al. | |

(56) References Cited

U.S. PATENT DOCUMENTS

| | | | |
|---|---|---|---|
| 7,952,485 B2 | 5/2011 | Schecter et al. | |
| 7,956,719 B2 | 6/2011 | Anderson, Jr. et al. | |
| 7,957,775 B2 | 6/2011 | Allen, Jr. et al. | |
| 7,984,220 B2 | 7/2011 | Gerard et al. | |
| 7,992,764 B2 | 8/2011 | Magnusson | |
| 7,992,794 B2 | 8/2011 | Leen et al. | |
| 8,032,254 B2 | 10/2011 | Amundson et al. | |
| 8,042,346 B2 * | 10/2011 | Oh et al. | 62/125 |
| 8,060,470 B2 | 11/2011 | Davidson et al. | |
| 8,087,593 B2 | 1/2012 | Leen | |
| 8,091,796 B2 | 1/2012 | Amundson et al. | |
| 8,110,945 B2 | 2/2012 | Simard et al. | |
| 8,136,738 B1 * | 3/2012 | Kopp | F24F 11/0034 165/237 |
| 8,138,634 B2 | 3/2012 | Ewing et al. | |
| 8,167,216 B2 | 5/2012 | Schultz et al. | |
| 8,216,216 B2 | 7/2012 | Warnking et al. | |
| 8,219,249 B2 | 7/2012 | Harrod et al. | |
| 8,239,066 B2 | 8/2012 | Jennings et al. | |
| 8,269,376 B1 * | 9/2012 | Elberbaum | H01H 9/167 307/115 |
| 8,276,829 B2 | 10/2012 | Stoner et al. | |
| 8,280,556 B2 | 10/2012 | Besore et al. | |
| 8,314,517 B2 | 11/2012 | Simard et al. | |
| 8,346,396 B2 | 1/2013 | Amundson et al. | |
| 8,417,091 B2 | 4/2013 | Kim et al. | |
| 8,437,878 B2 | 5/2013 | Grohman et al. | |
| 8,511,577 B2 | 8/2013 | Warren et al. | |
| 8,523,083 B2 | 9/2013 | Warren et al. | |
| 8,532,190 B2 | 9/2013 | Shimizu et al. | |
| 8,554,374 B2 | 10/2013 | Lunacek et al. | |
| 8,574,343 B2 | 11/2013 | Bisson et al. | |
| 8,613,792 B2 | 12/2013 | Ragland et al. | |
| 8,623,117 B2 | 1/2014 | Zavodny et al. | |
| 8,629,661 B2 | 1/2014 | Shimada et al. | |
| 8,680,442 B2 | 3/2014 | Reusche et al. | |
| 8,704,672 B2 | 4/2014 | Hoglund et al. | |
| 8,731,723 B2 | 5/2014 | Boll et al. | |
| 8,734,565 B2 | 5/2014 | Hoglund et al. | |
| 8,752,771 B2 | 6/2014 | Warren et al. | |
| 8,768,341 B2 | 7/2014 | Coutelou et al. | |
| 8,881,172 B2 | 11/2014 | Schneider | |
| 8,886,179 B2 | 11/2014 | Pathuri et al. | |
| 8,886,314 B2 | 11/2014 | Crutchfield et al. | |
| 8,902,071 B2 | 12/2014 | Barton et al. | |
| 9,002,523 B2 | 4/2015 | Erickson et al. | |
| 9,080,784 B2 | 7/2015 | Dean-Hendricks et al. | |
| 9,098,279 B2 | 8/2015 | Mucignat et al. | |
| 9,206,993 B2 | 12/2015 | Barton et al. | |
| 9,234,877 B2 | 1/2016 | Hattersley et al. | |
| 9,261,287 B2 | 2/2016 | Warren et al. | |
| 9,272,647 B2 | 3/2016 | Gawade et al. | |
| 9,366,448 B2 | 6/2016 | Dean-Hendricks et al. | |
| 9,374,268 B2 | 6/2016 | Budde et al. | |
| 2001/0029585 A1 | 10/2001 | Simon et al. | |
| 2001/0052459 A1 | 12/2001 | Essalik et al. | |
| 2002/0011923 A1 | 1/2002 | Cunningham et al. | |
| 2002/0022991 A1 | 2/2002 | Sharood et al. | |
| 2002/0082746 A1 | 6/2002 | Schubring et al. | |
| 2002/0092779 A1 | 7/2002 | Essalik et al. | |
| 2002/0181251 A1 | 12/2002 | Kompelien | |
| 2003/0033230 A1 | 2/2003 | McCall | |
| 2003/0034897 A1 | 2/2003 | Shamoon et al. | |
| 2003/0034898 A1 | 2/2003 | Shamoon et al. | |
| 2003/0040279 A1 | 2/2003 | Ballweg | |
| 2003/0060821 A1 | 3/2003 | Hall et al. | |
| 2003/0073891 A1 | 4/2003 | Chen et al. | |
| 2003/0103075 A1 | 6/2003 | Rosselot | |
| 2003/0177012 A1 | 9/2003 | Drennan | |
| 2004/0262410 A1 | 12/2004 | Hull | |
| 2005/0040250 A1 * | 2/2005 | Wruck | 236/51 |
| 2005/0083168 A1 | 4/2005 | Breitenbach | |
| 2005/0270151 A1 | 12/2005 | Winick | |
| 2006/0112700 A1 | 6/2006 | Choi et al. | |
| 2006/0196953 A1 | 9/2006 | Simon et al. | |
| 2006/0242591 A1 | 10/2006 | Van Dok et al. | |
| 2007/0013534 A1 | 1/2007 | DiMaggio | |
| 2007/0045429 A1 | 3/2007 | Chapman, Jr. et al. | |
| 2007/0114293 A1 | 5/2007 | Gugenheim | |
| 2007/0114295 A1 | 5/2007 | Jenkins et al. | |
| 2007/0114848 A1 | 5/2007 | Mulhouse et al. | |
| 2007/0115135 A1 | 5/2007 | Mulhouse et al. | |
| 2007/0119961 A1 | 5/2007 | Kaiser | |
| 2007/0163844 A1 | 7/2007 | Jahkonen | |
| 2007/0241203 A1 | 10/2007 | Wagner et al. | |
| 2007/0277061 A1 | 11/2007 | Ashe | |
| 2007/0289731 A1 | 12/2007 | Deligiannis et al. | |
| 2007/0290924 A1 | 12/2007 | McCoy | |
| 2007/0296260 A1 | 12/2007 | Stossel | |
| 2008/0015740 A1 | 1/2008 | Osann | |
| 2009/0143880 A1 | 6/2009 | Amundson et al. | |
| 2009/0154206 A1 | 6/2009 | Fouquet et al. | |
| 2009/0165644 A1 | 7/2009 | Campbell | |
| 2009/0167265 A1 | 7/2009 | Vanderzon | |
| 2009/0206657 A1 | 8/2009 | Vuk et al. | |
| 2010/0006660 A1 * | 1/2010 | Leen | G05D 23/1931 236/51 |
| 2010/0026379 A1 | 2/2010 | Simard et al. | |
| 2010/0084482 A1 | 4/2010 | Kennedy et al. | |
| 2010/0204834 A1 | 8/2010 | Comerford et al. | |
| 2010/0225267 A1 | 9/2010 | Elhalis | |
| 2010/0314458 A1 | 12/2010 | Votaw et al. | |
| 2011/0073101 A1 | 3/2011 | Lau et al. | |
| 2011/0133558 A1 | 6/2011 | Park | |
| 2011/0185895 A1 | 8/2011 | Freen | |
| 2011/0251807 A1 | 10/2011 | Rada et al. | |
| 2011/0291606 A1 | 12/2011 | Lee | |
| 2012/0155137 A1 | 6/2012 | Simard et al. | |
| 2012/0235490 A1 | 9/2012 | Lee et al. | |
| 2012/0323377 A1 | 12/2012 | Hoglund et al. | |
| 2013/0060385 A1 | 3/2013 | Leen et al. | |
| 2013/0158714 A1 | 6/2013 | Barton et al. | |
| 2013/0158715 A1 | 6/2013 | Barton et al. | |
| 2013/0158717 A1 | 6/2013 | Zywicki et al. | |
| 2013/0158718 A1 | 6/2013 | Barton et al. | |
| 2013/0158720 A1 | 6/2013 | Zywicki et al. | |
| 2013/0213952 A1 | 8/2013 | Boutin et al. | |
| 2013/0238142 A1 | 9/2013 | Nichols et al. | |
| 2013/0245838 A1 | 9/2013 | Zywicki et al. | |
| 2013/0261807 A1 | 10/2013 | Zywicki et al. | |
| 2014/0062672 A1 | 3/2014 | Gudan et al. | |
| 2014/0312131 A1 | 10/2014 | Tousignant et al. | |
| 2014/0312696 A1 | 10/2014 | Tousignant et al. | |
| 2014/0312697 A1 | 10/2014 | Landry et al. | |
| 2015/0001929 A1 | 1/2015 | Juntunen et al. | |
| 2015/0001930 A1 | 1/2015 | Juntunen et al. | |
| 2015/0002165 A1 | 1/2015 | Juntunen et al. | |
| 2015/0115045 A1 | 4/2015 | Tu et al. | |
| 2015/0144706 A1 | 5/2015 | Robideau et al. | |
| 2015/0145347 A1 | 5/2015 | Kim et al. | |
| 2015/0370265 A1 | 12/2015 | Ren et al. | |
| 2017/0192061 A1 | 7/2017 | Park | |
| 2017/0235291 A1 | 8/2017 | Foslien et al. | |

FOREIGN PATENT DOCUMENTS

| | | |
|---|---|---|
| EP | 0070414 A1 | 1/1983 |
| EP | 0434926 B1 | 8/1995 |
| EP | 0678204 B1 | 3/2000 |
| EP | 0985994 A1 | 3/2000 |
| EP | 1033641 A1 | 9/2000 |
| EP | 1143232 A1 | 10/2001 |
| EP | 1074009 B1 | 3/2002 |
| EP | 2138919 A1 | 12/2009 |
| FR | 2491692 A1 | 4/1982 |
| FR | 2711230 A1 | 4/1995 |
| WO | 9711448 A1 | 3/1997 |
| WO | 9739392 A1 | 10/1997 |
| WO | 0043870 A2 | 7/2000 |
| WO | 0152515 A1 | 7/2001 |
| WO | 0179952 A1 | 10/2001 |

(56) References Cited

FOREIGN PATENT DOCUMENTS

| WO | 0223744 A2 | 3/2002 |
|---|---|---|
| WO | 2010021700 A1 | 2/2010 |

OTHER PUBLICATIONS

International Search Report for Corresponding Application No. PCT/US2014/044229, dated Oct. 13, 2014.
U.S. Appl. No. 14/300,232, filed Jun. 9, 2014.
U.S. Appl. No. 14/301,175, filed Jun. 19, 2014.
U.S. Appl. No. 14/309,431, filed Jun. 19, 2014.
U.S. Appl. No. 14/309,553, filed Jun. 19, 2014.
U.S. Appl. No. 14/329,357, filed Jul. 11, 2014.
Hendon Semiconductors, "OM1894 Dual Sensing Precision Triac Control," Product Specification, Rev. 2.0, 21 pages, Apr. 19, 2007.
Signetics Linear Products, "TDA1024 Zero Crossing Triac Trigger," Product Specification, 14 pages, Sep. 1985.
Honeywell, "System Installation Guide: Important Instructions," Honeywell International Inc., 25 pages, 2011.
http://www.dimplex.com/en/home_heating/linear_convector_baseboards/products/lpc_series/linear_proportional_convector, Dimplex Coporation, "Linear Convector LPC Series," 2 pages, May 2011.
http://www.enernetcorp.com/, Hesse, Brad, Enernet Corporation, "Wireless Temperature Control" Article, 2011.
http://www.enernetcorp.com/t9000-wireless-thermostat.html, Enernet Corporation, "T9000 Series Wireless Fan Coil Thermostat," Product Brochure, 2 pages, 2011.
http://www.enocean-alliance.org/en/products/regulvar_rw-ssr347-15a/, Regulvar Corporation, "RW-SSR347-15A, Relais sans fil à semi-conducteurs" 3 pages, Aug. 8, 2009.
http://www.enocean-alliance.org/en/products/regulvar_rw-tp01/, Regulvar Corporation, "RW-TP01, Capteur de température sans fil" 3 pages, Aug. 9, 2009.
http://www.forwardthinking.honeywell.com/products/wireless/focus_pro/focus_pro_feature.html, Honeywell Corporation, "Wireless FocusPRO® pages", 2 pages, 2011.
Office Action for Canadian Application No. 2,774,907, dated Nov. 3, 2017.

* cited by examiner

| # | Display | Button | Step |
|---|---------|--------|------|
| 1) | Setpoints Schedule Copy<br>Format Anti-freeze Link<br>Lock Recovery<br>—29 | ▼ Exit Ok ▲<br>25 26 27 28 | From the installer's setup menu, press ▲ as needed to select Anti-Freeze and press OK. |
| 2) | Anti-freeze<br>On OFF<br>—29 | ▼ Exit Ok ▲<br>25 26 27 28 | Press ▼ or ▲ to set to OFF. Press OK. |

*Figure 3*

WIRELESS THERMOSTATIC CONTROLLED ELECTRIC HEATING SYSTEM

BACKGROUND

The present disclosure pertains to thermostatic controls and particularly to heating control. More particularly, the disclosure pertains to electric heating.

SUMMARY

The disclosure reveals electric heating system controlled with a remote thermostat. The system may incorporate wireless technology and a line voltage equipment interface sub-system. The sub-system may have a line voltage relay and an antenna. The relay may be mounted within an electric heater enclosure. The antenna may be mounted directly on the enclosure. The antenna may receive temperature control signals from a transmitter of the thermostat. The signals may be processed to control a connection of the heater to power with a relay receiving the processed control signals. The control of power to the heater may maintain a temperature approximately equal to a thermostat temperature setting. The antenna and relay electronics may provide a backup control of the heater in the event of, for example, a loss of signals from the thermostat. The backup control may prevent the temperature proximate to equipment interface sub-system from approaching a freezing point.

BRIEF DESCRIPTION OF THE DRAWING

FIG. 3 is a diagram showing buttons of a thermostat which may be used to effect a backup heater control;

DESCRIPTION

Figure 1:
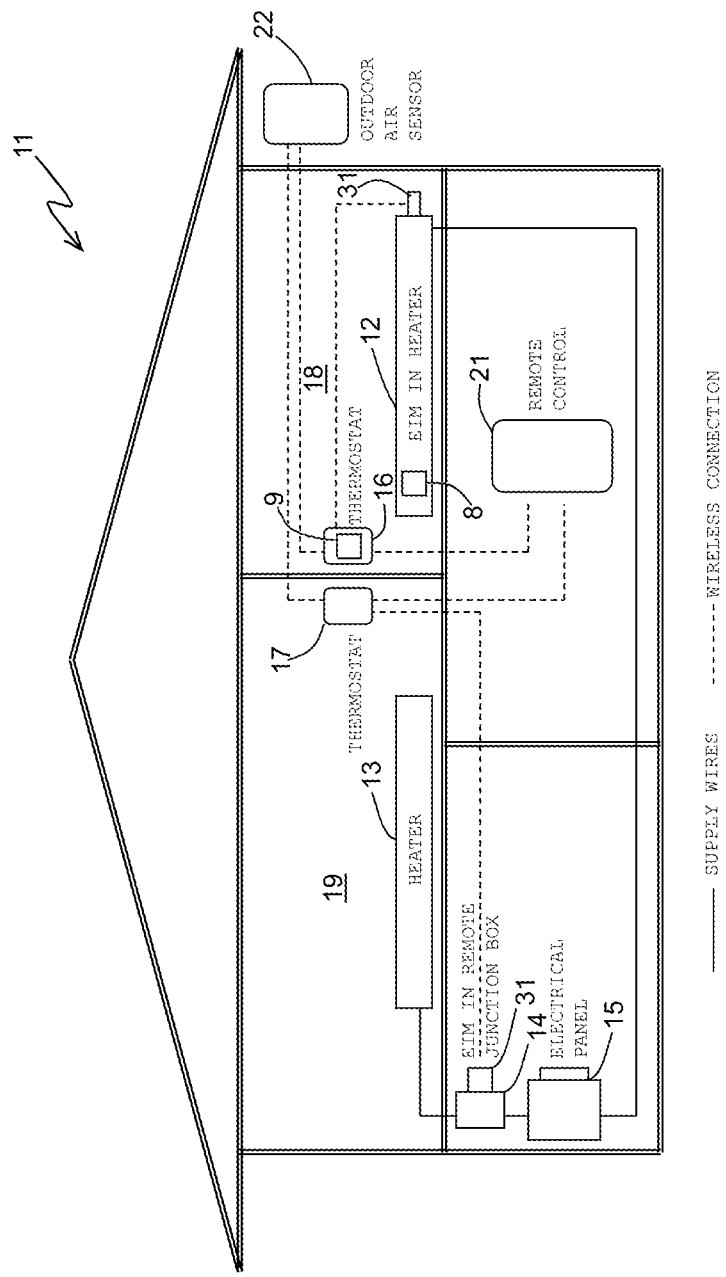
FIG. 1 is a diagram of an installation of an equipment interface sub-system, a wireless thermostat and wireless accessories which may be used to control an electric heater in a building.

When electrical contractors need to replace an existing baseboard built-in mechanical thermostat to a line voltage wall thermostat, they may face the difficulty of pulling new wires from the existing electric baseboard to a location where they will install the wall thermostat. For better temperature control, the thermostat should be put on the opposite wall from the wall of electrical heat source which may make it even more difficult and longer for contractors to run the wires especially in a retrofit application if all of the walls are closed and finished.

The present system may permit electrical contractors to provide a customer or homeowner a wall thermostat without the need to pull new wires through existing walls. The system may incorporate a battery wireless thermostat using REDLINK™ wireless technology and a line voltage equipment interface module (EIM) that can be mounted directly on an electric baseboard or be installed on a remote electrical junction box wired to a baseboard, convector or fan-forced heater. The equipment interface module may have a line voltage relay and an antenna.

A characteristic of the present system is that the antenna may be mounted directly on one of the side panels of the existing baseboard while the relay may be installed in the baseboard wiring compartment. There may be a cable with a connector that allows one to make a quick and easy connection between the antenna and the relay without the need to make conventional connection (e.g., wire screw terminal or solderless connector)

The present system may have an antenna that can be fixed outside of a baseboard through one of the knockouts normally found on either side of a baseboard side panels. This approach may be an ideal solution in retrofit application because many of the electrical baseboards available in North-America appear to have a knockout on each side panel of the baseboard.

Other systems might also have a two-component EIM structure; however, the antenna component may have to be either installed inside a wall or in the ceiling, or be wall-mounted while the relay is installed in a junction box or inside a baseboard wiring compartment. These other systems may still require an installer to provide low voltage wires from the relay to the antenna, thus resulting in additional installation steps and time.

For an OEM (original equipment manufacturer) specific design, the antenna may be made to be partially integrated inside of a baseboard without affecting the radio frequency (RF) performance (FIGS. 4-7). This design may enhance the aesthetics compared to an actual antenna housing designed to fit virtually on all baseboard retrofits. The integrated design may need to be made in partnership with an OEM so that the OEM can make a proper opening on the top of the baseboard and mount the antenna on its production line.

The present system may be for a retrofit market where customers want to replace baseboard built-in mechanical thermostats with electronic wall thermostats. The system may cover several main needs present in the actual electrical space heaters retrofit market, such as improving home comfort, improving energy savings, reducing installation time and cost, and providing convenience and ease of use The relay and associated electronics and the antenna and associated electronics may be in the same module. For example, there may be system with two or more sub-systems. One or more sub-systems may be situated in one module. There may be a baseboard module which incorporates relay components and antenna components, for example, a relay sub-system and an antenna sub-system, respectively. An example, module like this may be fixed inside or outside the baseboard. The power electronics may be in a relay sub-system. The relay sub-system may provide 12 volts of DC to the antenna sub-system. At a request of the antenna sub-system, the relay sub-system may switch on or off the power to an electric heater such as a baseboard. Specifically, the relay and antenna sub-systems may be situated in one or more modules.

The present system, for instance, may have an operating temperature range of 0° C. to 65° C. (32° F. to 149° F.), a working temperature range of −20° C. to 65° C. (−4° F. to 149° F.), and a shipping temperature range of −35° C. to 65° C. (−31° F. to 149° F.)

The line voltage wireless system may be installed through the following steps: 1) Wire and mount the EIM to the heating device (e.g., baseboard, convector or fan-forced heater); 2) Put batteries in the wireless devices (i.e., thermostat, PCC, OAS, and so forth); and 3) Link the wireless devices to the EIM. The first requirement may be made so that the system is installed directly on the baseboard and be mounted on a remote junction box.

There may be a system which incorporates backup heat control in the wireless thermostat. When a heating device like an electric heater is controlled by a wireless thermostat and the wireless communication is lost between the thermostat and the equipment interface module that turns on and off the heating device (which may be caused by dead batteries in the wireless thermostat or by a thermostat malfunction), the electric heater may always stay off, and thus the lack of heat can cause damage to a house if the temperature is low enough, for instance, to freeze water pipes in the building.

The present wireless plus line volt equipment interface module may provide a backup heat mode in case there is, for example, a thermostat room temperature sensor malfunction, which might occur if the thermostat batteries become completely depleted, or if the wireless communication is lost between the thermostat and the EIM.

The line volt EIM may incorporate two components: 1) A relay sub-system; and 2) An antenna sub-system. The relay sub-system may convert line voltage to low voltage to supply the antenna electronics and to turn the electric heater on or off. The relay sub-system may virtually always be installed inside a junction box or a wiring compartment of an electrical baseboard. The antenna sub-system may ensure wireless communication with the thermostat, and may have a user interface (UI) to link the EIM and the thermostat together. The antenna sub-system may also have a built-in temperature sensor that will be used to control the room temperature when the system goes into the backup heat mode (due to failure or other conditions) to avoid, for instance, water freezing in pipes situated in or close to the room where the EIM and heater are installed.

One may install and wire the EIM inside a baseboard heater compartment or on a junction box located in the same or close room that the electrical heater is intended to control in terms of temperature. Batteries may be used to power the wireless thermostat. The thermostat may be wirelessly linked to the EIM.

The batteries may be removed from the thermostat, the batteries may eventually become depleted, the thermostat may malfunction for some other reason, the antenna may fail to detect the wireless signals from the thermostat, or there may be another reason for failure of heater control external to the EIM. Such failure may require a backup heater control system. So when the room temperature comes down to about 55 degrees F. in a case where the thermostat is set for a higher room or space temperature, the heater may be cycled on and off by the EIM local thermostatic control to maintain the temperature at about 55 degrees. Other temperatures may be set above a damaging temperature for the backup heat portion of the EIM.

FIG. 1 is a diagram of an installation of an EIM which may be used to control an electric baseboard heater, a convector or a fan-forced heater. The diagram may use a home 11 as an example of the installation. There may be a heater 12 with an EIM installed in it and a heater 13 with an EIM installed a remote junction box 14. An electrical panel 15 may provide power for the heaters 12 and 13.

EIM 12 and EIM 13 may receive wireless signals from thermostats 16 and 17 to provide heat control for rooms 18 and 19, respectively, of home 11. The heat control system may also incorporate a remote control device 21, an outdoor air sensor 22 or other wireless devices with wireless connections to thermostats 16 and 17. Thermostat 16 (e.g., having a temperature sensor 2) may provide wireless control signals to the EIM in heater 12 (e.g., having a temperature sensor 8), which results in controlling heater 12 so as to maintain the temperature in room 18 according to a temperature setting on thermostat 16.

Thermostat 17 may provide wireless control signals to the EIM in junction box 14. The EIM may control electrical power from the electrical panel 15 to heater 13 so as to maintain the temperature in room 19 according to a temperature setting on thermostat 17. The temperature may match the setting within a predetermined delta of difference. The delta may be, for example, plus and minus one degree. Remote control 21 may be used to provide temperature settings on thermostats 16 and 17 with wireless signals. One characteristic of the EIM for heaters 12 and 13, is such that if the thermostat 16 or 17 fail to provide a control signal to the EIM of heater 12 or 13, respectively, then heaters 12 and 13 may not turn on to maintain the temperatures in rooms 18 and 19, respectively. However, if rooms 18 and/or 19 cool down because of a lack of heat from heaters 12 and/or 13, due to a loss of communication with one of the thermostats 16 and 17 or a defective sensor of one or more of the thermostats. Then the EIM may have a default condition which results in turning on heater 12 or 13 as needed to maintain a minimum temperature, such as 55 degrees F. (13 degrees C.), in room 18 or 19, respectively. The minimum temperature may be set at another level as appropriate to prevent damage, such as frozen water pipes, in room 18 or 19 or other areas of home 11. The protection may be turned off; however, it is recommended that the protection be left on. But the protection may be turned off for reasons including the respective EIM being installed in a junction box 14 located not in the same room as the heater controlled by the EIM. This default condition may be referred to as an "anti-freeze" function.

Figure 2:
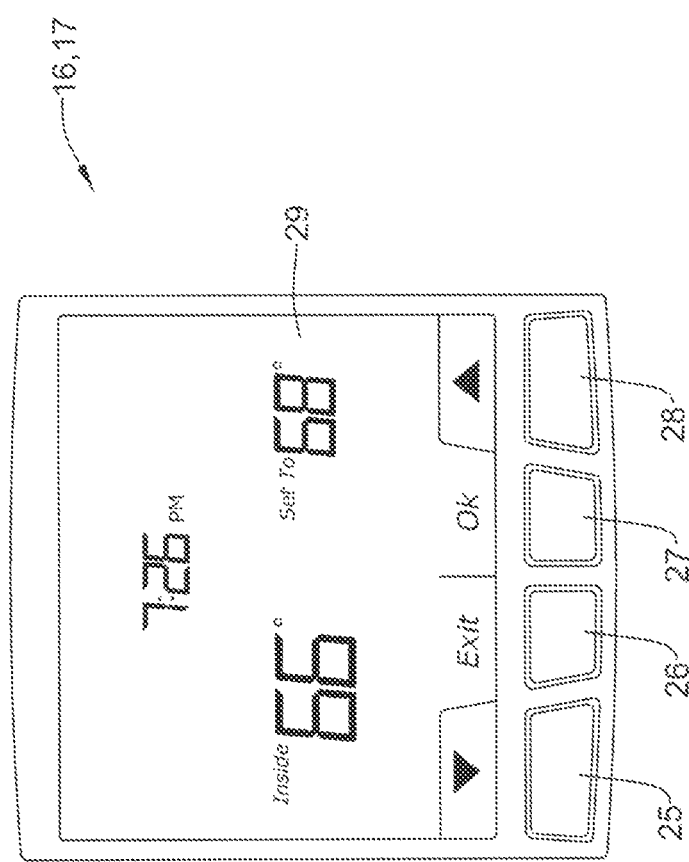
FIG. 2 is a diagram of an example thermostat that may be used with the electric heater.

FIG. 2 is a diagram of a thermostat 16 or 17. Equipment for a system in home 11 may be available from an entity provides an "EConnect™ Wireless Thermostat Kit TL9160AR" provided by Honeywell International Inc.

FIG. 3 shows buttons 25, 26, 27 and 28, some of which may be used to effect a backup heater control or an anti-freeze function. The function may be on by default. However, the anti-freeze protection may be turned off. With display 29 in step #1, a selection of "Anti-freeze" may be from a group of terms in an installer's setup menu in display 29. Button 28 may be pressed as needed to select "Anti-freeze" and then button 27 may be pressed to "OK" the selection. In step #2, screen 29 may show "Anti-freeze" and "On OFF". Button 25 or 28 may be pressed to set a selection to "OFF". Button 27 may be pressed for "OK". Button 26 may be pressed to exit the installer's setup menu and to return to the normal thermostat screen on display 29.

Figure 4:
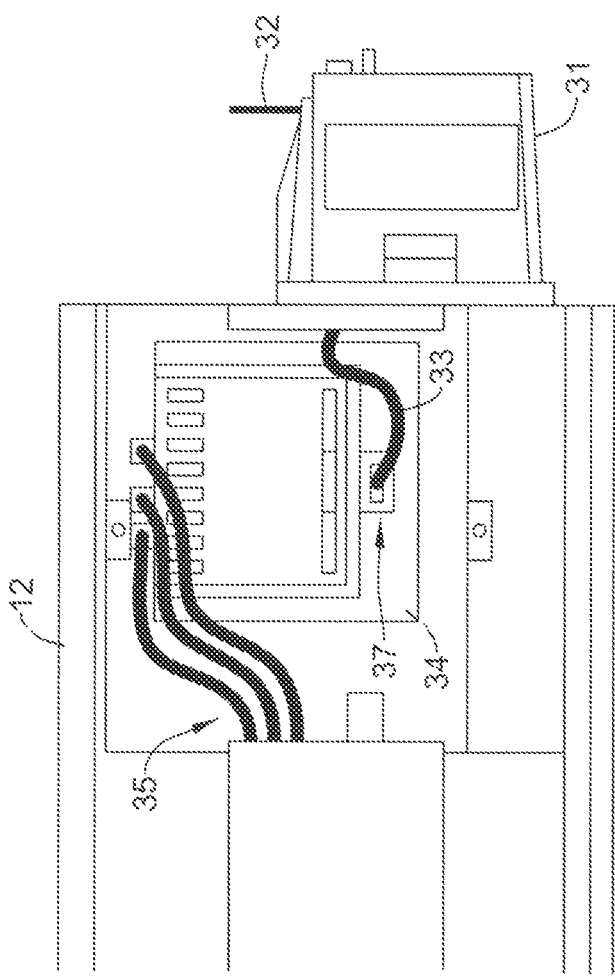
FIG. 4 is a diagram revealing an equipment interface sub-system in an enclosure of an electric heater.

FIG. 4 is a diagram revealing the EIM in heater 12. There may be antenna electronics in an enclosure/module 31. An antenna 32 may be connected to the antenna electronics and be part of enclosure 31 as it may be inside the electronics part of enclosure 31. Enclosure 31 may be mounted on heater 12. Antenna electronics of enclosure 31 may be connected via wire or wires 33 to a relay component 34 inside the housing of heater 12. Relay component 34 may be connected to a heating element of heater 12 via wires 35. Power from electrical panel 15 may be provided to heater 12 via wires.

Figure 5:
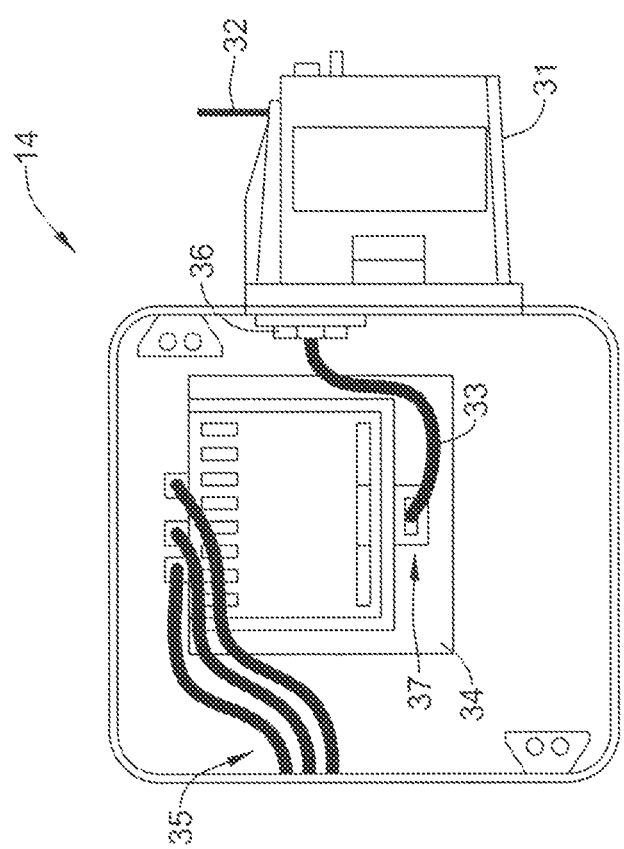
FIG. 5 is a diagram of an equipment interface sub-system situated in a junction box in lieu of a heater enclosure.

In situations where the EIM is not situated inside and not on the heater, such as heater 13, the EIM may have a relay component 34 mounted in a junction box 14 (e.g., a 4$^{11}/_{16}$" (11.9 cm) square box) as shown in a diagram of FIG. 5, and an antenna electronics enclosure 31 mounted on box 14 via a threaded protrusion with a cable or wire 33 through it, mounted through a hole of a punched out knockout. Enclosure 31 may be secured to box 14 with a matching threaded locknut 36 turned on the threaded protrusion, or other securing mechanism, and tightened to the surface of a side box 14. Wire 33 may be connected to relay component 34 with a matching connector and receptacle at location 37. Wires 35 may be connected from the relay component to power from the relay panel 15 and the heating element of heater 13 outside of junction box 14.

Figure 6:
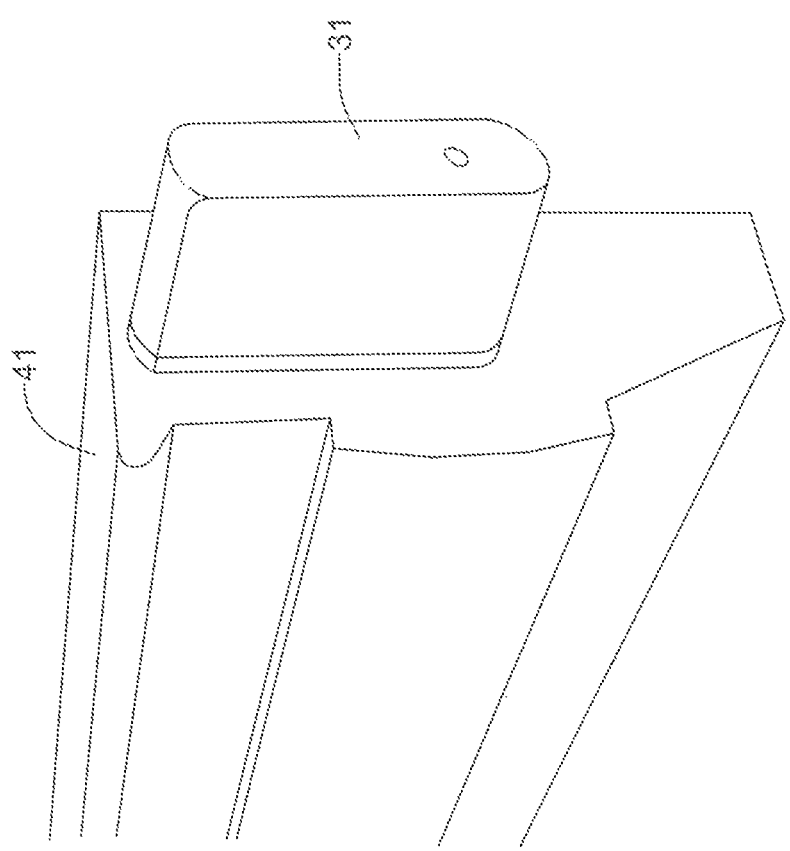
FIG. 6 is a diagram of an electric heater incorporating an equipment interface sub-system with an antenna mounted on a side surface of the heater enclosure.

FIG. 6 is a diagram of a heater 41 having an antenna electronics component/sub-system 31 mounted to the housing of heater 41 in a similar manner as component 31 is mounted to the housing of heater 12. Antenna 32 may be situated inside the housing of component 31 on heater 41. Relay component 34 may be situated within the housing of heater 41, but proximate to component 31.

Figure 7:
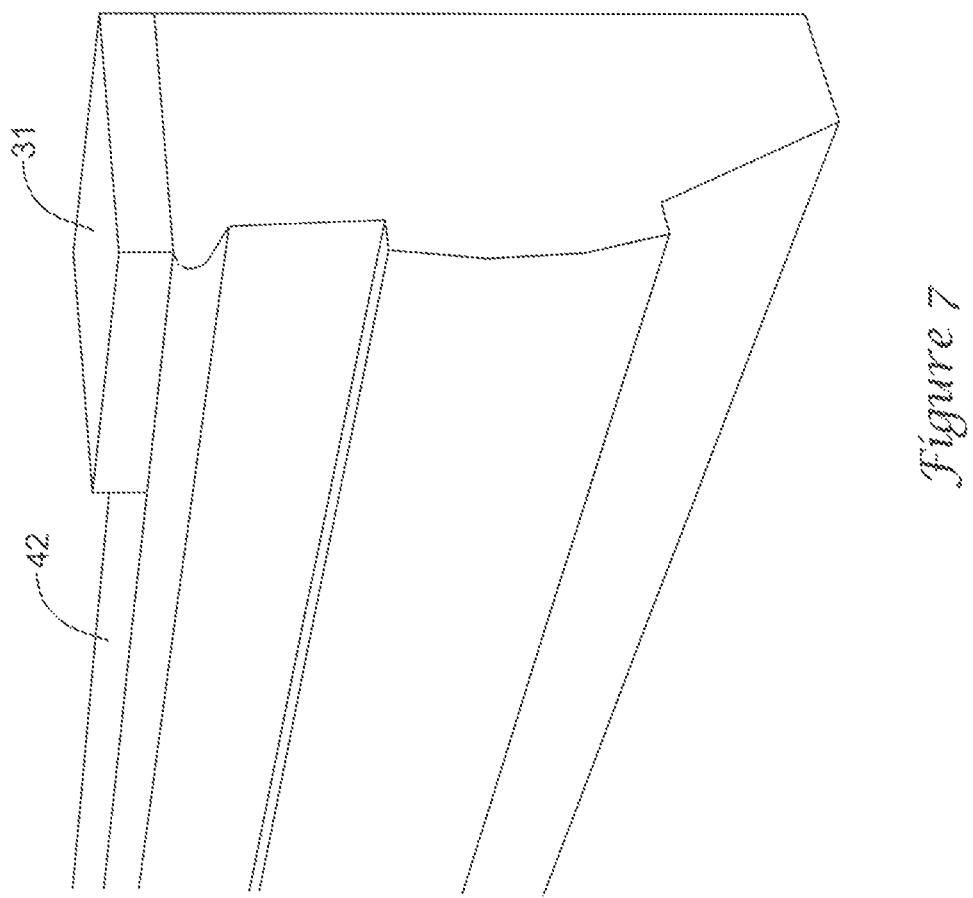
FIG. 7 diagram of an electric heater incorporating an equipment interface sub-system with an antenna mounted on a top surface of the heater enclosure.

FIG. 7 is a diagram of a heater 42 having an antenna electronics component/sub-system 31 mounted to the housing of heater 41 in a similar manner as component 31 is mounted to the housing of heater 12, but rather on the top instead on the side of the housing. Antennas 32 may be situated inside the housing of component 31. The relay component 34 may be situated within the housing of heater 42, but proximate to component 31.

Figure 8:
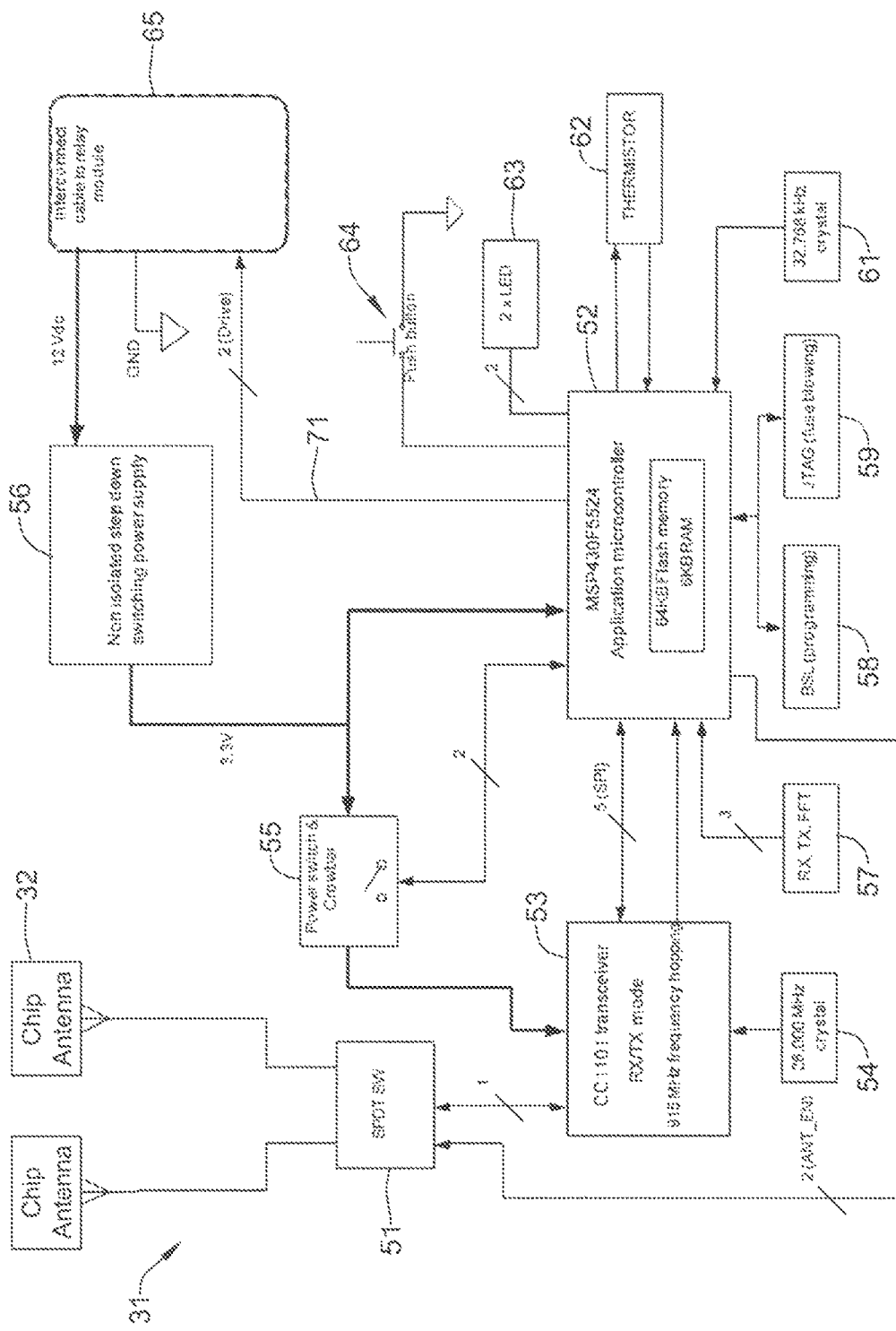
FIG. 8 is a block diagram of an antenna sub-system for heater control.

FIG. 8 is a block diagram of antenna sub-system or component 31. A chip antenna 32 may be connected to a SPDT switch 51. Switch 51 may be controlled by a connection from an application microcontroller 52. Controller may, for example, incorporate an MSP430F5524 chip having a 16 bit processor, 64 KB of flash memory and 6 KB of RAM. Switch 51 may be connected to a transceiver 53 having 915 MHz frequency hopping. A 26,000 MHz oscillator crystal 54 may be connected to transceiver 53. Transceiver 53 may be connected to microcontroller 52. A crowbar and power switch 55 may convey power, for instance at 3.3 volts, from a non-isolated step-down switching power supply 56 to transceiver 53. Switch 55 may be controlled by microcontroller 52. Power from supply 56 may also be provided to microcontroller 52. A DC voltage of about 12 volts may be provided from an interconnect cable-to relay sub-system or component 65 to supply 56.

An RX, TX, FFT (fast Fourier transform) circuit 57 may be connected to microcontroller 52. BSL (bootstrap loader programming) and JTAG (joint test action group fuse blowing) circuits 58 and 59, respectively, may be connected to microcontroller 52. A 32.768 kHz oscillator crystal and thermistor 62 may be connected to microcontroller 52. One or more LEDs and a push button switch 64 may be connected to microcontroller 52. An output of microcontroller may provide drive signals via sub-system 65 to relay sub-system 34.

Figure 9:
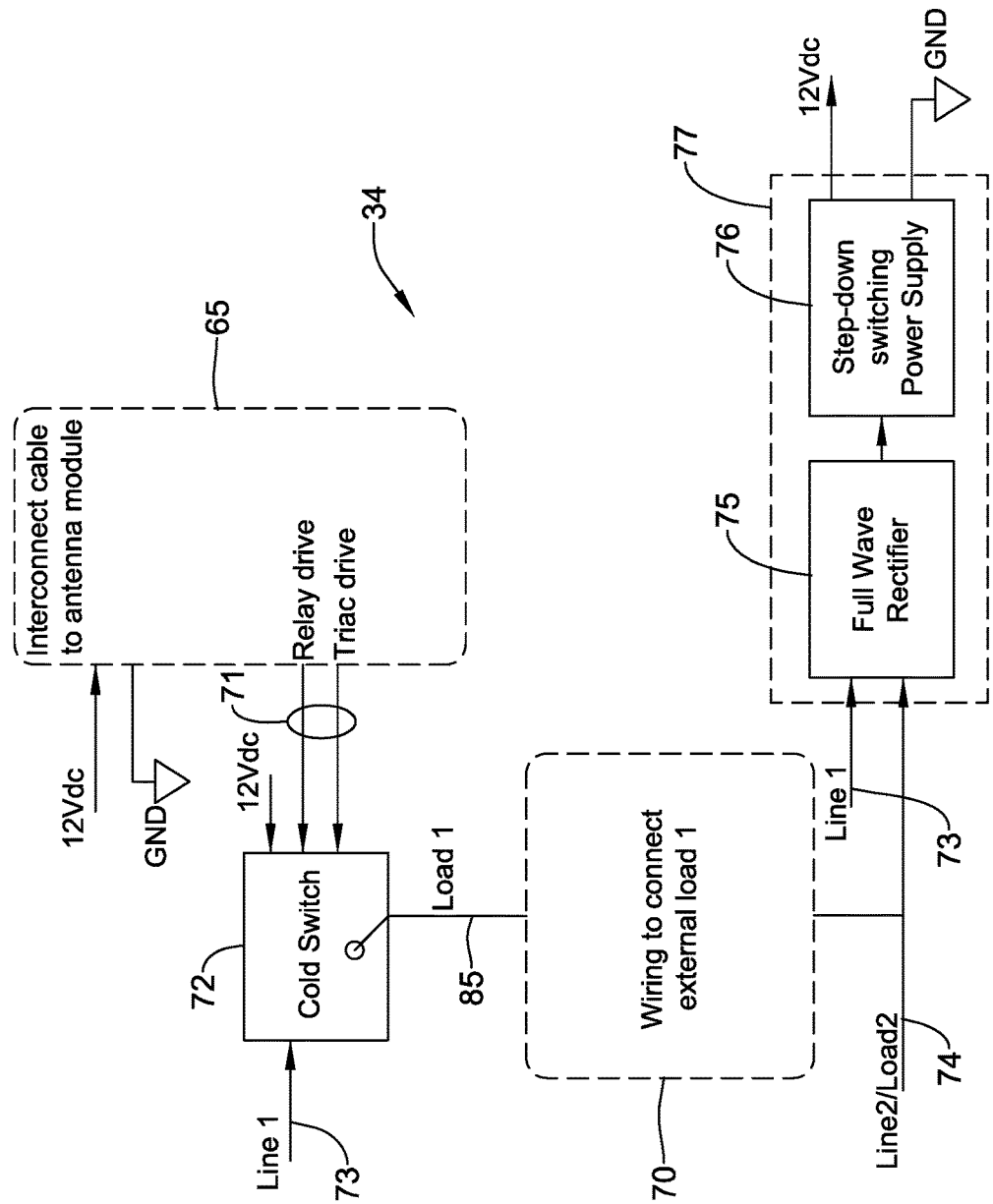
FIG. 9 is a block diagram of a relay sub-system for heater control.

FIG. 9 is a block diagram of relay sub-system 34. Relay and triac drive signal lines 71 may be provided from antenna sub-system 31 via interconnect cable 65 to a cold switch 72. A power line 73 (i.e., a first line of power) may be provided to switch 72 and power may be provided from the switch, as indicated by drive signals 71, to wiring 70 which is connected to an external load, such as a baseboard heater 12 or 13 (FIG. 1). Another power line 74 (i.e., the second line of power) may be connected to wiring 70 for connection to the external load. Lines 73 and 74 may be connected to a full-wave rectifier 75. A rectified power of the lines may go from rectifier 75 to a step-down switching power supply 76. An output of power supply 76 may be 12 volts which may be provided to the interconnect cable 65, which in turn may be provided to cold switch 72, and to power supply 56 noted herein.

Figure 10A:
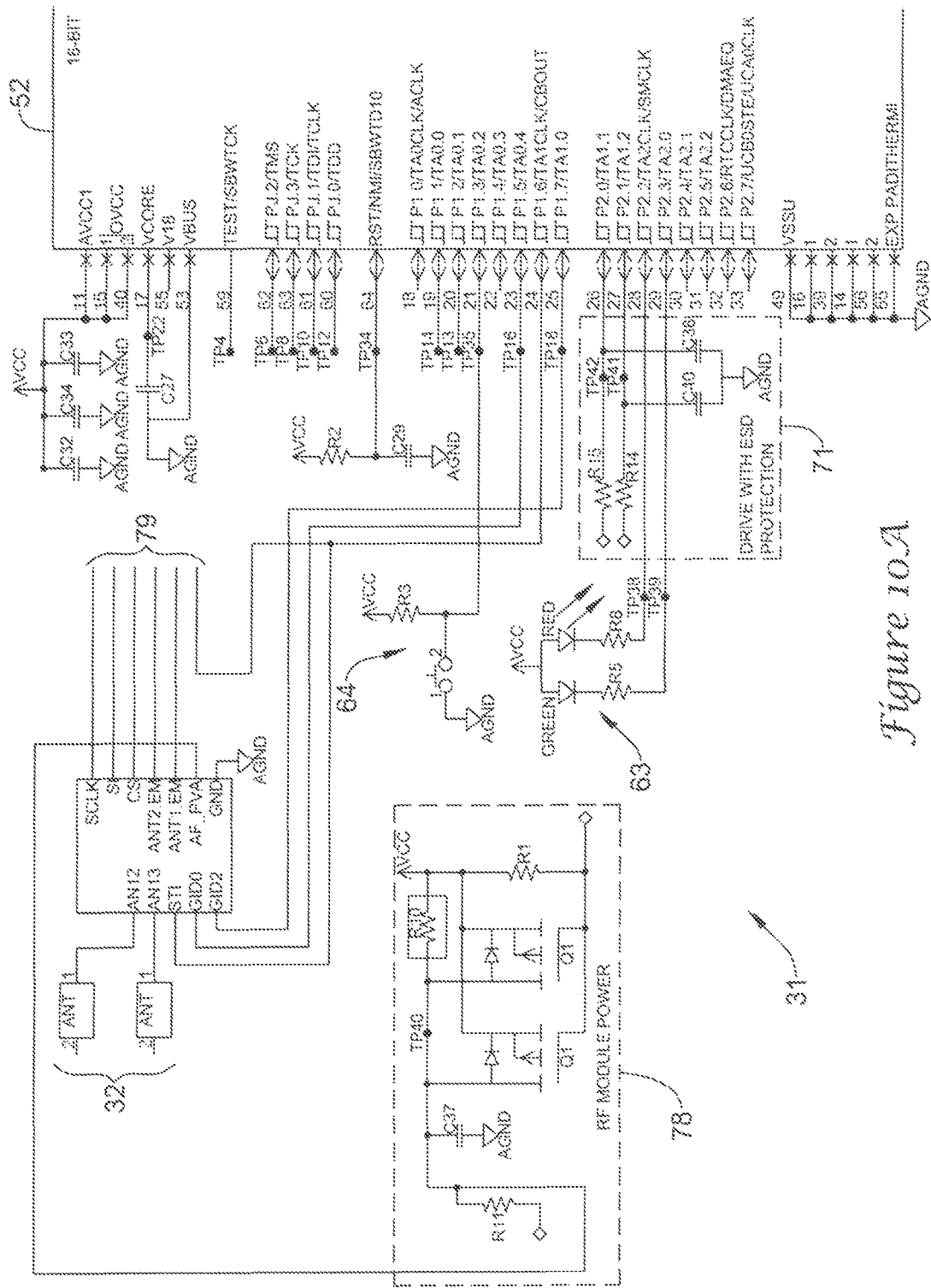
FIGS. 10a and 10b are schematic diagrams of an example circuit for an antenna sub-system.
Figure 10B:
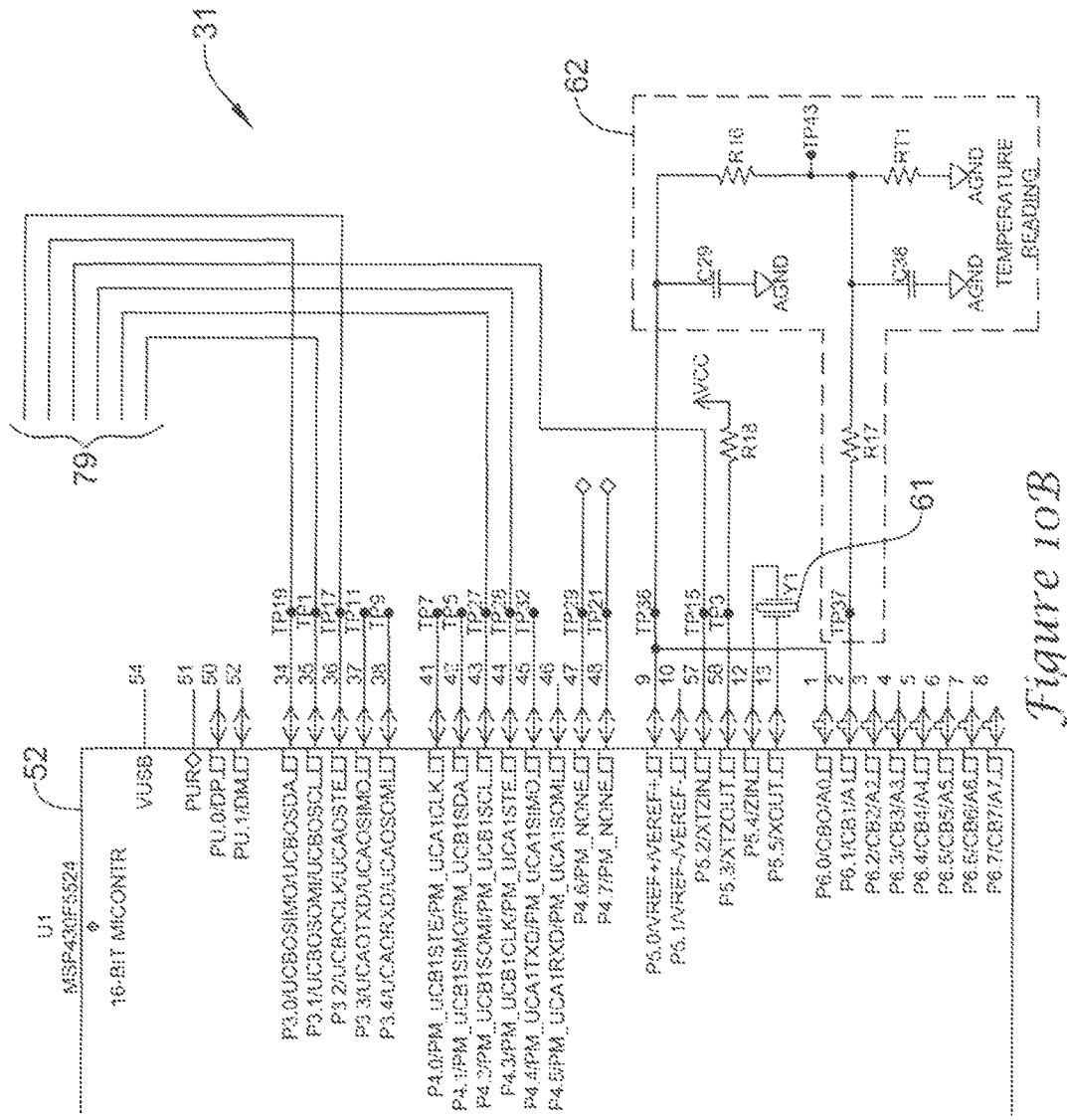

FIGS. 10*a* and 10*b* show a schematic of an example circuit for antenna sub-system 31. A 16 bit processor or microcontroller 52 is shown with components connected to it, such as antennas 32 an LED indicator 63, drive lines 71 with electrostatic discharge protection, push button 64, oscillator crystal 61, temperature reading circuitry or thermistor 62, and RF power circuitry 78. FIG. 10*a* shows a left side portion and FIG. 10*b* shows a right side portion of microcontroller 52. Lines 79 are continuous between FIGS. 10*a* and 10*b* in the same order as shown. Various components and circuitry may be built from the schematic of FIGS. 10*a* and 10*b* to obtain an example antenna sub-system 31.

Temperature reading item 62 may utilize temperature measurement with an ADC (analog to digital converter) having 12 bit resolution. If, for example, an RF link is lost for 14 minutes, then the antenna sub-system may control the ambient heater temperature at 13° C.±2° C. (55° F.±3.6° F.).

Figure 11:
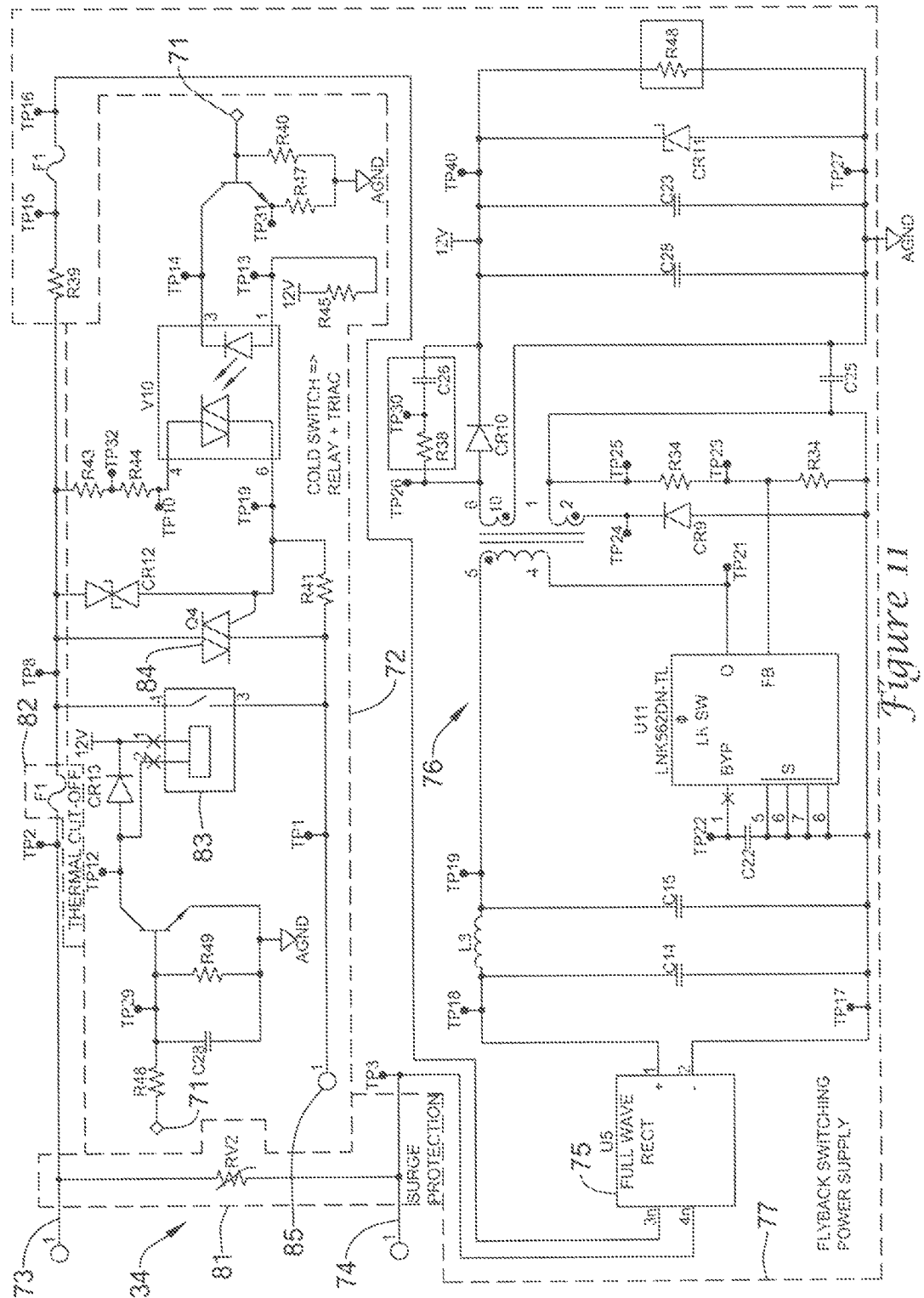
FIG. 11 is a schematic diagram of an example circuit for relay sub-system.
Figure 12:
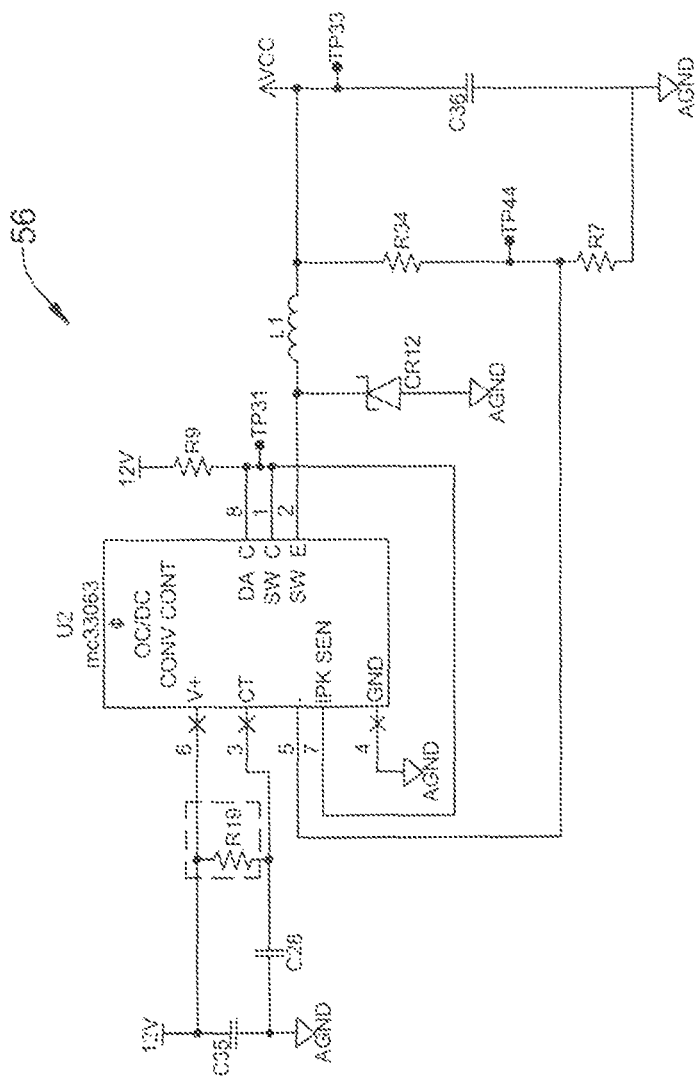
FIG. 12 is a schematic diagram of an example power supply circuit.
Figure 13B:
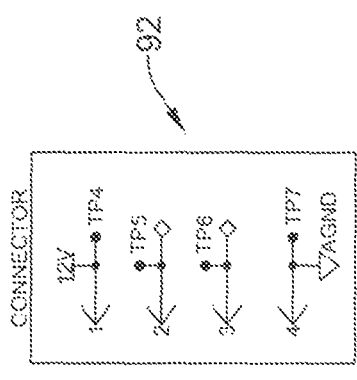
FIGS. 13a and 13b are diagrams showing connector information for the schematics of the antenna and relay sub-systems.
Figure 13A:
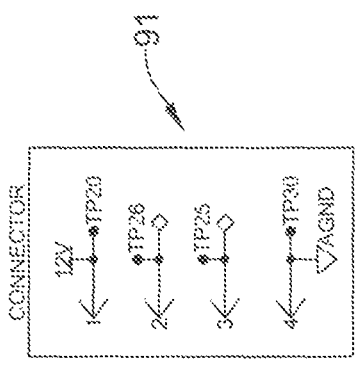

FIG. 11 shows a schematic of an example circuit for relay sub-system 34. Power may come in to sub-system 34 on lines 73 and 74. There may be a surge protection device 81 connected across the power lines. There may be a thermal cut-off circuit 82 for protection against an overload, such as a short-circuit in the circuitry of sub-system 34. Power lines 73 and 74 may be connected to the cold switch 72 which may incorporate a relay 83 and triac 84. Drive lines 71 may be connected to circuitry for items 83 and 84. Power from line 73 may be provided to a line 85 by the relay and triac. Line 85 may be connected via wiring (FIG. 9) along with line 74 to a load such as a baseboard heater 12 or 13 (FIG. 1). Power line 73 after the thermal cut-off 82 may be connected along with line 74 to a flyback switching power supply 77. Supply may incorporate the full wave rectifier 75 and the step-down switching power supply 76. Supply 77 may provide 12 volt DC power for some of the circuitry and items of components 31 and 34. FIG. 12 is a diagram of a circuit schematic for the 12 volt to 3.3 volt power switching supply 56 (FIG. 8). Supply 56 may provide 3.3 volt DC power for some of the circuitry and items of components 31 and 34. FIGS. 13*a* and 13*b* show connector information, respectively, in blocks 91 and 92 for the schematics of sub-systems 31 and 34.

To recap, a wireless thermostat system for an electric heater may incorporate a thermostat, an antenna sub-system and a relay sub-system connected to the antenna sub-system. The thermostat may have a wireless transmitter. The antenna sub-system may incorporate an antenna for detecting signals from the wireless transmitter and a first electronic circuit having an input connected to the antenna. The relay sub-system may incorporate a second electronic circuit having an input connected to an output of the first electronic circuit, a relay with an input connected to an output of the second electronic circuit, and an output for connecting power to an input of an electric heater.

The first electronic circuit may incorporate a temperature sensor and a low limit circuit connected to the temperature sensor. If a signal from the temperature sensor to the low limit circuit indicates a temperature below a predetermined temperature, then the low limit circuit may provide a signal via the second electronic circuit to the relay for connecting power to the electric heater. The predetermined temperature may be set above freezing. The low limit circuit may selectively be activated or deactivated.

The thermostat may further incorporate a temperature setting mechanism and a third electronic circuit connected to the temperature setting mechanism and the wireless transmitter. The transmitter may transmit one or more signals which are received by the antenna sub-system. The one or more signals may indicate a temperature setting on the temperature setting mechanism. The first electronic circuit may provide a signal to the second electronic circuit to have the relay connect power to the electric heater to maintain a temperature at the temperature setting on the temperature setting mechanism.

The system may further incorporate a thermostat remote control device. The remote control device may wirelessly make one or more selections from a group consisting of a temperature setting on the temperature setting mechanism and activation or deactivation of a low limit circuit.

The relay sub-system may be situated within a housing of the electric heater. The antenna sub-system may be situated on an external panel of the housing of the electric heater. The antenna sub-system may be fixed outside of the external panel through a knockout found on the external panel. Wire connections between the antenna sub-system and the relay sub-system may be through the knockout.

The relay sub-system may be situated within a junction box. The antenna sub-system may be situated on the junction box with connections to the relay sub-system made through a knockout on a side of the junction box. The relay sub-system may further be wired between electric power and the heater.

A method for implementing a wireless thermostat system for an electric heater, may incorporate providing a wireless thermostat, providing an antenna sub-system having an antenna and a first electronic circuit connected to the antenna, providing a relay sub-system having a relay and a second electronic circuit connected to the relay, mounting the relay sub-system in a housing of an electric heater, connecting an output of the relay to an input of the electric heater, mounting the antenna sub-system on a surface of a side of the housing, and connecting an input of the relay sub-system to the antenna sub-system.

The method may further incorporate punching out a knockout on the surface of the side of the housing, and running wires for connecting the antenna sub-system to the relay sub-system through a hole resulting from punching out the knockout on the surface of the side. The hole may be used for securing the antenna sub-system to the side of the housing. The surface may be an external surface.

A temperature setting on the wireless thermostat may be transmitted by the thermostat with signals through a wireless medium. The signals may be received by the antenna and processed by the first electronic circuit into drive signals. The thermostat may have a temperature indicator. The drive signals may be conveyed to the second electronic circuit to be provided to the relay which provides an electric power connection to the electric heater as indicated by the drive signals to bring the temperature on the temperature indicator to a magnitude that matches the temperature setting within a predetermined delta of difference.

The first electronic circuit may incorporate a temperature limit circuit, a temperature sensor connected to the temperature limit circuit, and a temperature limit setting input device connected to the temperature limit circuit. If a temperature indication from the temperature sensor is less than a temperature limit set on the temperature setting input device, then a limit drive signal may be conveyed to the second electronic circuit to be provided to the relay which connects the electric heater to power as indicated by the limit drive signal to bring the temperature indication from the temperature sensor within a predetermined delta to the temperature limit set on the temperature setting input device.

A wireless thermostatic mechanism for electric heating may incorporate an antenna sub-system, a thermostat having a wireless connection to the antenna sub-system, and a relay sub-system having a wired connection to the antenna sub-system. The relay sub-system may connect electrical power to an electric heater.

The mechanism may further incorporate a temperature sensor connected to the antenna sub-system. If the wireless connection is lost between the thermostat and the antenna sub-system, then the antenna sub-system may provide a signal to the relay to connect electrical power to the electric heater sufficient to maintain a predetermined temperature in a space where the antenna sub-system is situated.

The relay sub-system may be situated inside of a housing of the electric heater. The antenna sub-system may be attached to a surface on the housing of the electric heater. The relay sub-system may have an overload switch which disengages electrical power to the heater in the event that the power usage of the electric heater exceeds a predetermined amount.

The antenna sub-system may incorporate an antenna, a transceiver connected to the antenna, and a microcontroller connected to the transceiver. The relay sub-system may have a power supply and a power switch having an input terminal connected to the power supply and an output connected to the transceiver and the microcontroller.

The antenna sub-system may further incorporate a temperature sensor connected to the microcontroller for detecting a near-freeze condition. The microcontroller may provide a drive signal to the relay sub-system to connect the electric heater to power to prevent a freeze condition.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A wireless thermostat system for an electric heater, comprising:
    a thermostat having a first temperature sensor;
    an equipment interface module (EIM) separate from the thermostat and wirelessly connected to the thermostat, the EIM comprising:
        an antenna sub-system; and a relay sub-system connected to the antenna sub-system; and wherein:

the thermostat comprises a wireless transmitter;

the antenna sub-system comprises:
   an antenna for detecting signals from the wireless transmitter; and
   a first electronic circuit having a second temperature sensor and an input connected to the antenna;

the relay sub-system comprises:
   a second electronic circuit having an input connected to an output of the first electronic circuit; and
   a relay with an input connected to an output of the second electronic circuit, and having an output for connecting power to an input of an electric heater;

the EIM is configured to control the electric heater in response to control signals received from the thermostat, the control signals being based on temperature sensed with the first temperature sensor; and the EIM is configured to control the electric heater independent of the thermostat when the second temperature sensor senses a temperature below a predetermined temperature.

2. The system of claim 1, wherein the first electronic circuit comprises:
   a low limit circuit connected to the second temperature sensor; and
   wherein if a signal from the second temperature sensor to the low limit circuit indicates a temperature below the predetermined temperature, then the low limit circuit provides a signal via the second electronic circuit to the relay for connecting power to the electric heater.

3. The system of claim 2, wherein the predetermined temperature is set above freezing.

4. The system of claim 2, wherein the low limit circuit can selectively be activated or deactivated.

5. The system of claim 1, wherein the thermostat further comprises:
   a temperature setting mechanism; and
   a third electronic circuit connected to the temperature setting mechanism and the wireless transmitter.

6. The system of claim 5, wherein:
   the transmitter transmits one or more signals which are received by the antenna sub-system;
   the one or more signals indicate a temperature setting on the temperature setting mechanism; and
   the first electronic circuit provides a signal to the second electronic circuit to have the relay connect power to the electric heater to maintain a temperature at the temperature setting on the temperature setting mechanism.

7. The system of claim 5, further comprising:
   a thermostat remote control device; and
   wherein the remote control device can wirelessly make one or more selections from a group consisting of a temperature setting on the temperature setting mechanism and activation or deactivation of a low limit circuit.

8. The system of claim 1, wherein:
   the relay sub-system is situated within a housing of the electric heater; and
   the antenna sub-system is situated on an external panel of the housing of the electric heater.

9. The system of claim 8, wherein:
   the antenna sub-system is fixed outside of the external panel through a knockout found on the external panel; and
   wire connections between the antenna sub-system and the relay sub-system are through the knockout.

10. The system of claim 1, wherein:
   the relay sub-system is situated within a junction box;
   the antenna sub-system is situated on the junction box with connections to the relay sub-system made through a knockout on a side of the junction box; and
   the relay sub-system is further wired between electric power and the heater.

11. A wireless thermostatic mechanism for electric heating, comprising:
   an equipment interface module (EIM) comprising:
      an antenna sub-system having a first temperature sensor; and
      a relay sub-system having a wired connection to the antenna sub-system, wherein the relay sub-system connects electrical power to an electric heater;
   a thermostat having a second temperature sensor and having a wireless connection to the antenna sub-system of the EIM;
   the EIM is configured to control the electric heater in response to control signals received from the thermostat, the control signals being based on temperature sensed with the second temperature sensor; and
   the ELM is configured to control the electric heater independent of the thermostat when the first temperature sensor senses a temperature below a predetermined temperature.

12. The mechanism of claim 11, further comprising:
   wherein if the wireless connection is lost between the thermostat and the antenna sub-system, then the antenna sub-system provides a signal to the relay to connect electrical power to the electric heater based on measurements taken from the first temperature sensor and sufficient to maintain the predetermined temperature in a space where the EIM is situated.

13. The mechanism of claim 11, wherein:
   the relay sub-system is situated inside of a housing of the electric heater; and
   the antenna sub-system is attached to a surface on the housing of the electric heater.

14. The mechanism of claim 11, wherein the relay sub-system comprises an overload switch which disengages electrical power to the heater in the event that the power usage of the electric heater exceeds a predetermined amount.

15. The mechanism of claim 11, wherein:
   the antenna sub-system comprises:
      an antenna;
      a transceiver connected to the antenna; and
      a microcontroller connected to the transceiver; and
   the relay sub-system comprises:
      a power supply; and
      a power switch having an input terminal connected to the power supply and an output connected to the transceiver and the microcontroller.

16. The mechanism of claim 15, wherein:
   the antenna sub-system further comprises the first temperature sensor connected to the microcontroller for detecting a near-freeze condition; and
   the microcontroller provides a drive signal to the relay sub-system to connect the electric heater to power to prevent a freeze condition.

17. A wireless thermostatic mechanism for electric heating, comprising:
   an equipment interface module (EIM) comprising:
      an antenna sub-system having a temperature sensor; and a relay sub-system having a wired connection to the antenna sub-system, wherein the relay sub-system connects electrical power to an electric heater;
a thermostat having a wireless connection to the antenna sub-system of the EIM; and
wherein:
the antenna sub-system comprises:
an antenna;
a transceiver connected to the antenna; and
a microcontroller connected to the transceiver; and
the relay sub-system comprises:
a power supply; and
a power switch having an input terminal connected to the power supply and an output connected to the transceiver and the microcontroller;
the EIM is configured to control the electric heater in response to control signals received from the thermostat, the control signals being based on temperature sensed by the thermostat; and
the EIM is configured to control the electric heater independent of the thermostat when a temperature sensed by the ELM is below a predetermined temperature.

\* \* \* \* \*